Jan. 1, 1935.  E. J. McMAHON  1,986,590
RECIPROCATING MECHANISM
Filed May 9, 1932
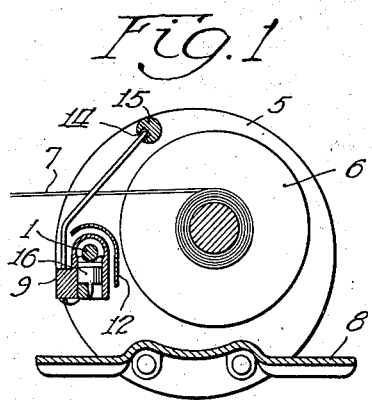
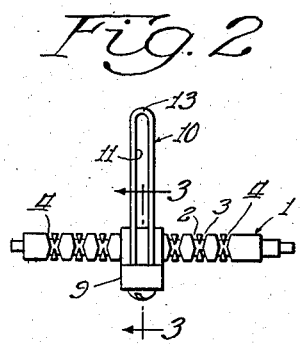
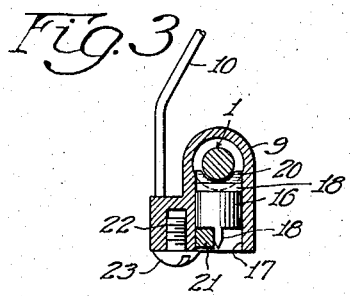
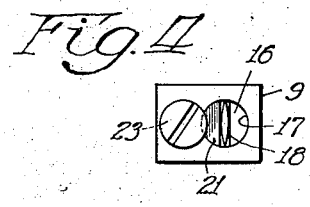
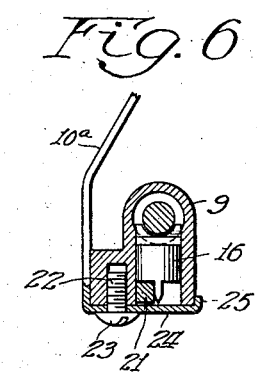
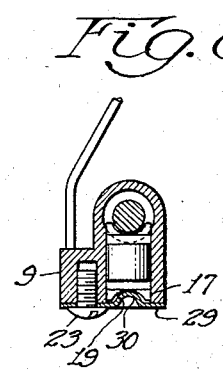
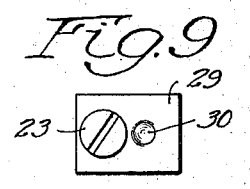
Inventor
Edward J. McMahon Patented Jan. 1, 1935

1,986,590

UNITED STATES PATENT OFFICE 1,986,590

RECIPROCATING MECHANISM

Edward J. McMahon, Bronson, Mich., assignor to Bronson Reel Company, Bronson, Mich., a corporation of Michigan Application May 9, 1932, Serial No. 610,046

13 Claims. (Cl. 242—84.4)

This invention relates to reciprocating mechanism and more particularly to reciprocating mechanism comprising a rotatable shaft having direction reversing threads thereon and a pivoted member having a plurality of surfaces for engagement with said threads.

The invention is of particular utility in connection with the line leveling mechanism of fishing reels, in which use I have illustrated the invention in the drawing.

Among other objects, my improvement provides economy of construction, enhanced efficiency in operation and greater convenience to the user over prior art devices.

I will describe the invention by reference to the exemplary constructions shown in the accompanying drawing, in which—

Figure 1 is a cross section of a conventional fishing reel with my invention applied thereto;

Figure 2 is a front view of reciprocating mechanism employed in the structure of Figure 1;

Figure 3 is a section taken on the line 3—3 of Figure 2;

Figure 4 is a bottom plan view of the structure of Figure 3;

Figure 5 is a view of separated parts of the structure of Figure 3;

Figure 6 shows a modification of the parts shown in Figure 5 but in assembled relationship;

Figure 7 is a further modification of the structure of Figure 3;

Figure 8 is a still further modification; and

Figure 9 is a bottom plan view of the structure of Figure 8.

Referring in detail to the figures of the drawing, I have shown a rotatable shaft 1 provided with direction reversing threads such as the helical grooves 2 and 3. As is well known in the art, these grooves intersect and merge into common direction reversing cam slots 4 at each end of the shaft 1, whereby a member movable with reference to the shaft and having a cam portion received in said slots will be reciprocated upon rotation of the shaft, the member having its direction of travel reversed at each end of the shaft.

In the illustrative use of the invention, the shaft 1 is suitably journaled in the frame 5 of the conventional fishing reel shown in cross section in Figure 1. The reel has a spool 6 upon which the line 7 may be wound by the action of the usual crank (not shown), the reel being mounted upon its rod by means of a bracket 8. By appropriate mechanism which is well known in the art and therefore need not be shown, the crank which rotates the spool 6 also simultaneously rotates the shaft 1.

It is desirable of course that the line 7 be wound level upon the spool 6, and to accomplish this, the member reciprocated by the shaft 1 is here represented by the line guide 9 through which the shaft 1 passes. The line guide has suitably secured thereto an elongated eye piece 10 having the slot 11 therein through which the line 7 freely passes. Thus as the line guiding member 9 is reciprocated upon the shaft 1, the line 7 will be moved back and forth over the spool 6 as it is being wound thereon and piling up of the line at any one point on the spool is prevented and the line wound level thereon.

The reel may advantageously be provided with a fixed guard plate 12 having a smooth rounded surface adjacent the slot 11 and mounted between the shaft 1 and the spool 6 to limit the movement of the line in the slot 11 and guard against the line entering grooves 2 and 3. To prevent rotation of the member 9 with respect to the shaft 1, the rounded end 13 of the eye piece 10 may be received to reciprocate in a slot 14 extending parallel to the shaft 1 and appropriately formed in the tie rod 15 connecting the end plates of the frame 5 of the reel.

To cause reciprocation of the line guide 9 upon the shaft 1 the guide is provided with a member pivoted thereon and which has a cam portion entering and arranged to travel in the helical grooves 2 and 3 and the cam slots 4. Such pivoted member is here shown as the pawl 16 which is provided with a plurality of such cam portions. In this instance the pawl 16 is cylindrical to be received in the cylindrical recess 17 in the guide 9 and to be pivotally retained in said recess with one of its cam portions entering the grooves of the shaft. I have shown the cam portions of the pawl in the form of diametrically disposed blades 18 at each end of the pawl, the blades being thin enough to enter the grooves. To conform to the contour of the shaft, the blades are concaved axially of the pawl as at 19 thus providing two horns 20 at each side of the concavity 19, these horns being desirably tapered to a thin edge at their ends and sides so as to slide freely in the grooves of the shaft.

When the pawl is retained in the guide 9 as presently described, the blade 18 at the inner end of the pawl is held in one of the grooves of the shaft such as the groove 2, for example, and as the shaft is rotated the well known cam action between the blade 18 and the helical conformation of the groove will cause the guide 9 to be moved axially of the shaft 1 until the blade engages the cam slot 4 at the left hand end of the shaft (Fig. 2). The cam slot 4 is a continuation of the grooves 2 and 3 and is so formed as to lead the blade 18 from the groove 2 back to the groove 3, reversing the direction of movement of the member 9 and causing it to travel toward the right hand end of the shaft 1. In the act of reversal, the pawl 16 must be permitted to pivot in the guide 9 and in accordance with my invention, I have shown the pawl pivotally maintained in engagement with the shaft 1 by a detent shown in Figs. 3, 4 and 5 as the semi-circular washer 21 which is received in the recess 17 between the wall of the recess and the blade 18 at the outer end of the pawl. A set screw 22 threadedly entering the guide 9 has its head 23 arranged to overlap the washer 21. Thus the pawl and detent are maintained in assembly with each other and with the guide 9 and the pawl is maintained in engagement with the shaft 1 while at the same time the pawl is free to pivot slightly as required. To facilitate contact of the screw head 23 with the detent, the blades 18 may be disposed at right angles to each other as clearly shown in Figures 3 and 5.

So constructed and arranged, I have provided a double ended pawl which is readily reversible to have either end placed in operative engagement with the shaft 1. This feature is of distinct advantage, since, while the parts referred to are constructed of suitable metal, the wear particularly on the pawl is considerable and it may become necessary to change the pawl while the reel is in service. By means of my invention the fisherman has the equivalent of a spare pawl always accessible.

If preferred, the eye piece may be secured to the guide 9 by the same screw 22 which retains the detent 21 in position, as shown in Figure 6, and the eye piece 10a in such case may be formed of sheet metal and have a base 24 which is screwed against the guide by the screw 22 and a lip 25 which laps one of the sides of the guide to prevent rotation upon the screw. As shown in Figure 6, the screw head 23 then presses upon the detent 21 through the intermediation of the base 24 of the eye piece 10a.

In Figure 7, I have shown a modified form of detent such as the circular washer 26 which has a portion 27 received in the concavity 19 of one of the blades 18 and slots 28 at each side of the portion 27 which receive the horns 20 of the blade. The washer 26 is maintained in engagement with the pawl 16 by the set screw 22 as is the washer 21 shown in Fig. 3.

In Figure 8, I have shown a still further modification of the detent in the form of the plate 29 clamped by the screw-head 23 to the guide 9 so as to overlie the recess 17 and having the boss 30 which may be made by indenting the plate. The boss 30 which is thus somewhat dome-shaped seats in the concavity 19 of the pawl and provides a ball bearing upon which the pawl may pivot slightly as already described while at the same time the pawl is suitably maintained in operative position.

In the constructions shown in Figs. 7 and 8, the blades 18 may be in the same plane as shown in Fig. 8, instead of being at right angles to each other.

I claim:

1. In a level winding device for a fishing reel, the combination with a line guide; of a rotatable shaft passing through said guide and having direction reversing grooves therein for reciprocating said guide, of a reversible pawl pivotally carried by said guide, said pawl being provided at each end with means for engaging the said grooves, and a detent carried by said guide and engageable with either end of the pawl for retaining the pawl in place in the guide, whereby the pawl may be reversed in said guide to have either end engage the grooves.

2. In a level winding device for a fishing reel, the combination with a line guide; of a rotatable shaft passing through said guide and having direction reversing grooves therein for reciprocating said guide on the shaft; of a reversible pawl pivotally carried by said guide, said pawl being provided at each end with a blade for engaging in the said grooves; a detent carried by said guide, said detent engaging the blade at one end of the pawl for retaining the blade at the other end of the pawl in the grooves but permitting pivoting of the pawl in the guide; and means for retaining the detent in assembly with the guide and the pawl.

3. In a level winding device for a fishing reel, the combination with a line guide; of a rotatable shaft passing through said guide and having direction reversing grooves therein for reciprocating the guide on the shaft; of a reversible pawl received in a cylindrical recess in the guide and provided at each end with a diametrically disposed blade for engaging in the said grooves at the inner end of the recess; a semi-circular detent entering the outer end of said recess between the wall thereof and the blade; and a set screw threadedly entering the guide and having a head overlapping the detent to retain the detent in engagement with the pawl and the pawl in engagement with the grooves.

4. The structure of claim 3 wherein the line guide is provided with an eye piece to receive the line therethrough, said eye being retained on the guide by the set screw.

5. In a level winding device for a fishing reel, the combination with a line guide; of a rotatable shaft passing through said guide and having direction reversing grooves therein for reciprocating the guide on the shaft; of a reversible pawl received in a cylindrical recess in the guide and provided at each end with a diametrically disposed blade for engaging in the said grooves at the inner end of the recess, the blades having a portion concave axially of the pawl; a circular detent entering the outer end of the recess and having a portion entering the concavity of the blade at the outer end of the pawl and slots adjacent said portion for receiving the portions of the blade at each side of the concavity; and a set screw threadedly entering the guide and having a head overlapping the detent to retain the detent in engagement with the pawl and the pawl in engagement with the grooves.

6. In a level winding device for a fishing reel, the combination with a line guide; of a rotatable shaft passing through said guide and having direction reversing grooves therein for reciprocating the guide on the shaft; of a reversible pawl received in a cylindrical recess in the guide and provided at each end with a diametrically disposed blade for engaging in the said grooves at the inner end of the recess, the blades having a portion concave axially of the pawl; a detent having a dome-shape portion entering the concavity of the blade at the outer end of the pawl, said pawl being pivoted on said portion by the action of the direction reversing grooves of the shaft; and a set screw threadedly entering the guide and having a head overlapping the detent to retain the detent in engagement with the pawl.

7. A reciprocating mechanism comprising a rotatable shaft having direction reversing threads thereon, a reciprocable member, a pivoted pawl carried by the member and having a plurality of surfaces selectively engageable with the threads for causing reciprocation of the member upon rotation of the shaft, and means carried by the member and engageable with one of said surfaces on the pawl to cause the other of said surfaces to engage the threads.

8. A reciprocating mechanism comprising a rotatable shaft having direction reversing threads thereon, a reciprocable member, a pawl having means at either end selectively engageable with said threads, said member having a pawl receiving recess therein receiving the pawl in position to have either of said ends in engagement with the threads, and means carried by the member for pivotally retaining the pawl in said recess in either of said selective positions.

9. A level winding attachment for fishing reels comprising a rotatable shaft having direction-reversing threads thereon, a reciprocable member having a recess, the axis of said recess substantially intersecting the axis of said shaft, a pawl insertable in said recess from the end remote from the shaft, said pawl having a projection on each end thereof, each projection comprising spaced horns, and a concave portion between said horns, and a pawl retainer having a contact surface in the form of a surface of revolution shaped to fit said concave portion and hold said pawl in operative engagement with said threads without wearing engagement between said horns and said retainer.

10. A level winding attachment for fishing reels comprising a rotatable shaft having direction-reversing threads thereon, a reciprocable member having a recess, a pawl insertable in said recess from the end remote from the shaft, said pawl having a projection on each end thereof, each projection comprising spaced horns, and a concave portion between said horns, and a pawl retainer having a contact surface in the form of a surface of revolution shaped to fit said concave portion and hold said pawl in operative engagement with said threads.

11. A level winding attachment for fishing reels comprising a rotatable shaft having direction-reversing threads thereon, a cylindrical pawl having a thread-engaging blade on each end thereof, and a pawl holder receiving said pawl and slidable on said shaft, said holder including pawl-retaining means engaging the bladed end of said pawl remote from said shaft to prevent axial movement of said pawl out of engagement with said shaft, said retaining means permitting free rotation of said pawl about its own axis.

12. A level winding attachment for fishing reels comprising a rotatable shaft having direction-reversing threads thereon, a cylindrical pawl having a thread-engaging blade on each end thereof, and a pawl holder receiving said pawl and slidable on said shaft, said holder including pawl-retaining means engaging the bladed end of said pawl remote from said shaft and substantially at the axis of said pawl to prevent axial movement of said pawl out of engagement with said shaft, said retaining means permitting free rotation of said pawl about its own axis.

13. A combination according to claim 2 in which the blade at one end of the pawl lies in a plane at right angles to the blade at the other end of the pawl.

EDWARD J. McMAHON.